United States Patent
Balenda, II

(10) Patent No.: US 9,500,268 B2
(45) Date of Patent: Nov. 22, 2016

(54) LOCKING DIFFERENTIAL ASSEMBLY

(71) Applicant: American Axle & Manufacturing, Inc., Detroit, MI (US)

(72) Inventor: Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 182 days.

(21) Appl. No.: 14/559,075

(22) Filed: Dec. 3, 2014

(65) Prior Publication Data

US 2016/0160981 A1 Jun. 9, 2016

(51) Int. Cl.
*F16H 48/24* (2006.01)
*F16H 48/34* (2012.01)
*F16H 48/40* (2012.01)
*F16H 48/08* (2006.01)

(52) U.S. Cl.
CPC .............. *F16H 48/24* (2013.01); *F16H 48/40* (2013.01); *F16H 48/08* (2013.01); *F16H 48/34* (2013.01)

(58) Field of Classification Search
CPC ........ F16H 48/08; F16H 48/24; F16H 48/34; F16H 48/40
See application file for complete search history.

(56) References Cited

U.S. PATENT DOCUMENTS

| | | | |
|---|---|---|---|
| 3,105,394 A * | 10/1963 | Salzmann | F16H 48/08 192/56.61 |
| 5,749,803 A | 5/1998 | Teraoka et al. | |
| 7,445,575 B2 * | 11/2008 | Capito | F16D 11/04 475/204 |
| 8,167,764 B2 | 5/2012 | Balenda, II et al. | |
| 2015/0204431 A1 * | 7/2015 | Cochren | F16H 48/34 475/150 |

OTHER PUBLICATIONS

Photographs marked up illustrating the Ford Super Duty Electric Locking Differential Mechanism.

* cited by examiner

*Primary Examiner* — Jacob S Scott
(74) *Attorney, Agent, or Firm* — Harness, Dickey & Pierce, P.L.C.

(57) ABSTRACT

A locking differential assembly having a locking dog that is mounted in a differential case in a manner that permits the locking dog to be translated along an axis between a first position, in which the locking dog is disengaged from a side gear in the differential case, and a second position in which the locking dog is engaged to the side gear. The locking dog is coupled to the differential case in a manner that permits an increasing range of rotation of the locking dog relative to the differential case with axial movement of the locking dog toward the second position. An axle assembly with the locking differential assembly and a related method for forming a locking differential assembly are also provided.

14 Claims, 6 Drawing Sheets

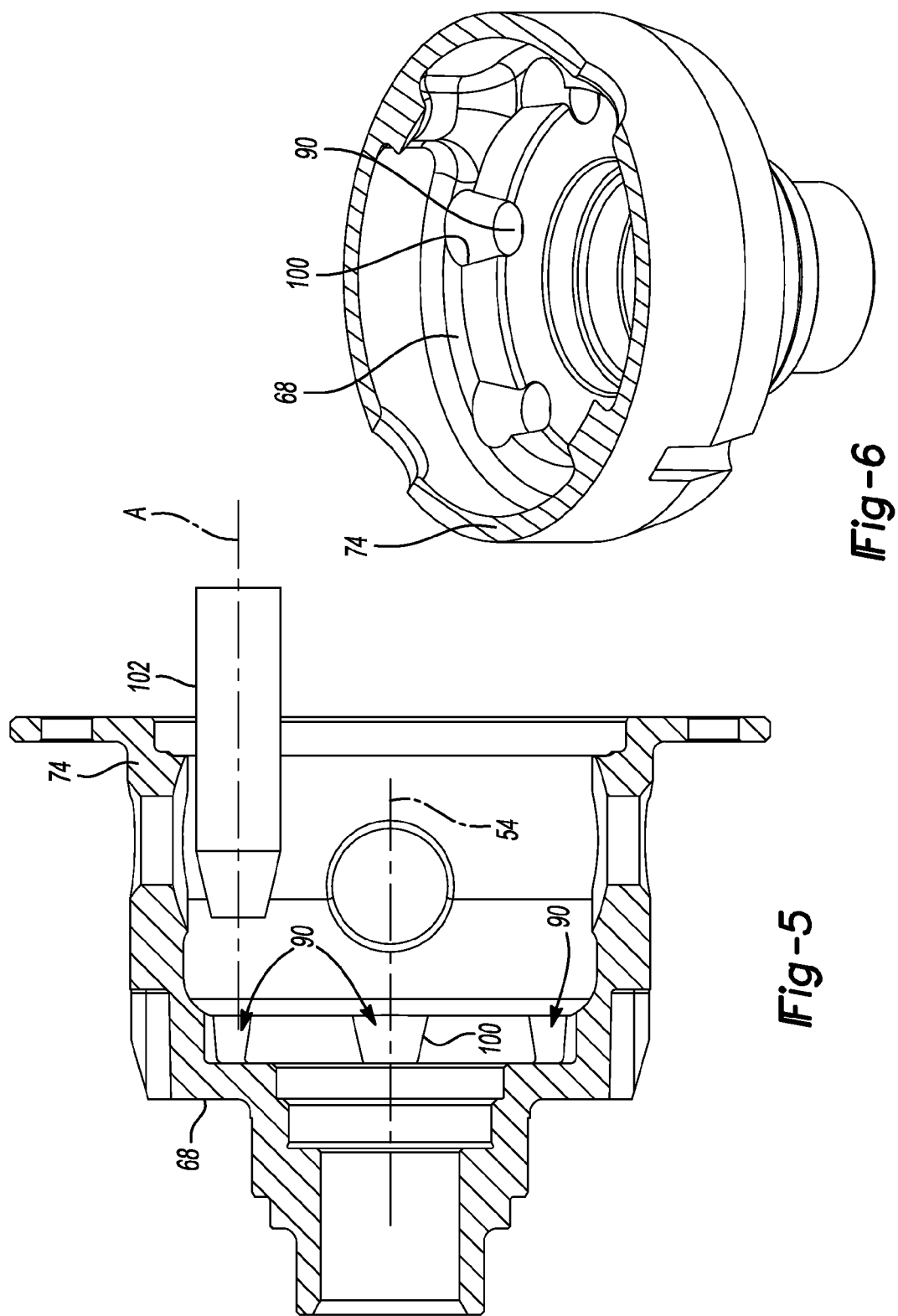

LOCKING DIFFERENTIAL ASSEMBLY

FIELD

The present disclosure relates to a locking differential assembly.

BACKGROUND

This section provides background information related to the present disclosure which is not necessarily prior art.

Various types of differential assemblies are known in the art for transmitting rotary power from a power train to a pair of vehicle wheels. Typically, a differential assembly includes a differential case and a differential gearset with a pair of side gears that are driven by the differential case. One type of differential assembly is known as a locking differential assembly and is configured to selectively lock one or both of the output side gears of the differential gearset to the differential case for common rotation about a rotary axis. Typically, the locking differential assembly includes a locking dog that is non-rotatably but slidably mounted to the differential case so as to be movable into a position where it engages one of the side gears so as to inhibit rotation of the side gear relative to the differential case. While this configuration is well suited for its intended purpose, this type of locking differential assembly is nevertheless susceptible to improvement.

SUMMARY

This section provides a general summary of the disclosure, and is not a comprehensive disclosure of its full scope or all of its features.

In one form, the present disclosure provides a locking differential assembly with a differential case, a differential gearset and a locking mechanism. The differential case has a first case member and a second case member that cooperate to define a cavity. The first case member has a first end wall 68. The differential gearset is received in the cavity and has a first side gear. The locking mechanism has a plurality of lock apertures, a first locking dog, and a second locking dog. The lock apertures are formed in the first end wall 68. The first locking dog has a set of first dog teeth that are fixedly coupled to the first side gear. The second locking dog has an annular body, a set of second dog teeth and a plurality of locking tabs. The set of second dog teeth extend from the annular body and are configured to be engaged with the set of first dog teeth to inhibit relative rotation between the first and second locking dogs. The locking tabs extend radially outwardly from the annular body and are received in the lock apertures. The second locking dog are movable along an axis between a first position, in which the set of second dog teeth is disengaged from the set of first dog teeth to permit relative rotation between the first side gear the differential case, and a second position in which the set of second dog teeth is engaged with the set of first dog teeth to inhibit relative rotation between the first side gear and the differential case. The lock apertures have a first locking surface that is at least partly frusto-conically shaped. The locking tabs define a second locking surface that is configured to matingly engage the first locking surface.

In another form, the present disclosure provides a method for forming a locking differential assembly. The method includes: providing a first case member that is configured to be rotatable about a rotary axis, the first case member having a plurality of locking apertures, each of the locking apertures defining a first locking surface with a frusto-conical shape; installing a locking dog to the first case member, the locking dog having a body, a set of first locking teeth, and a plurality of locking tabs, the set of first locking teeth extending axially from the body, the locking tabs extending radially from the body and being received into the locking apertures, the locking tabs defining a second locking surface and being received into the locking apertures, at least a portion of the second locking surface being frusto-conically shaped and configured to matingly engage the first locking surface; and installing a differential gearset to the first case member, the differential gearset having a side gear with a set of second locking teeth that are configured to selectively matingly engage the set of first locking teeth.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a longitudinal section view of a portion of the locking differential assembly illustrating a first case member in more detail;

FIG. 6 is a perspective, partly broken-away view of the first case member illustrating locking apertures formed in the first case member;

Corresponding reference numerals indicate corresponding parts throughout the several views of the drawings.

DETAILED DESCRIPTION

Example embodiments will now be described more fully with reference to the accompanying drawings.

Figure 1:
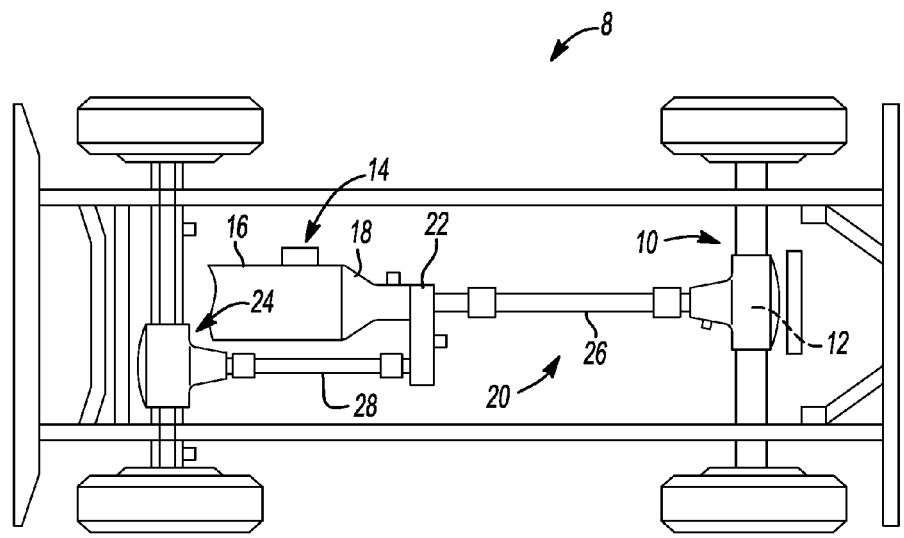
FIG. 1 is a schematic illustration of a vehicle having a rear axle assembly with an exemplary locking differential assembly constructed in accordance with the teachings of the present disclosure.

With reference to FIG. 1 of the drawings, a vehicle 8 is schematically illustrated as having a rear axle assembly 10 with a locking differential assembly 12 constructed in accordance with the teachings of the present disclosure. The vehicle 8 is a four-wheel drive vehicle having a powertrain 14 with an engine 16 and a transmission 18 that provide rotary power to a drivetrain 20 having a transfer case 22, the rear axle assembly 10 and a front axle assembly 24. Rotary power can be transmitted from the transfer case 22 to the rear axle assembly 10 and the front axle assembly 24 via rear and front propshafts 26 and 28, respectively. The configuration of the front axle assembly 24 can be generally similar to that of the rear axle assembly 10 and as such, a discussion of the rear axle assembly 10 will suffice for the front axle assembly 24.

Figure 2:
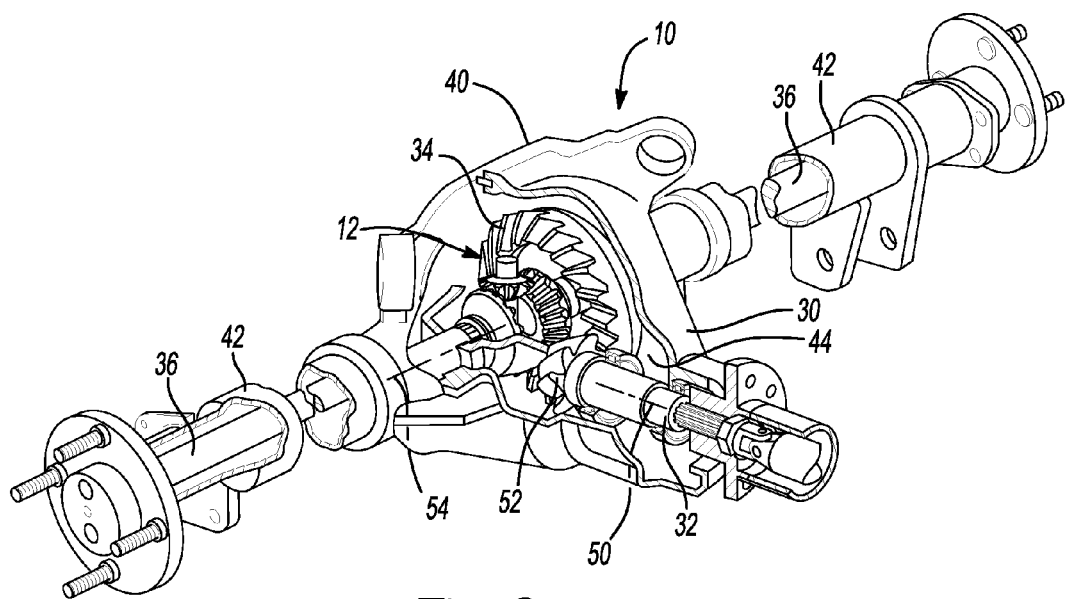
FIG. 2 is a perspective view of the rear axle assembly of FIG. 1.

In FIG. 2, the rear axle assembly 10 is illustrated as including an axle housing assembly 30, an input pinion 32, a ring gear 34, the locking differential assembly 12, and a pair of axle shafts 36. The axle housing assembly 30 can be any type of housing assembly, such as a Banjo-type axle housing assembly, but in the particular example provided, the axle housing assembly 30 is a Salisbury-type axle housing assembly having a carrier housing 40 and a pair of axle tubes 42 that are coupled to the carrier housing 40 in a conventional and well known manner. The carrier housing 40 can define a cavity 44 into which the locking differential assembly 12 is received.

The input pinion 32 can be mounted to the carrier housing 40 for rotation about a first axis 50. The input pinion 32 can include a pinion gear 52 that can be disposed in the cavity 44. The ring gear 34 can be received in the cavity 44 and rotatable about a second axis 54 that can be transverse or generally perpendicular to the first axis 50. The ring gear 34 can be meshingly engaged to the pinion gear 52.

Figure 3:
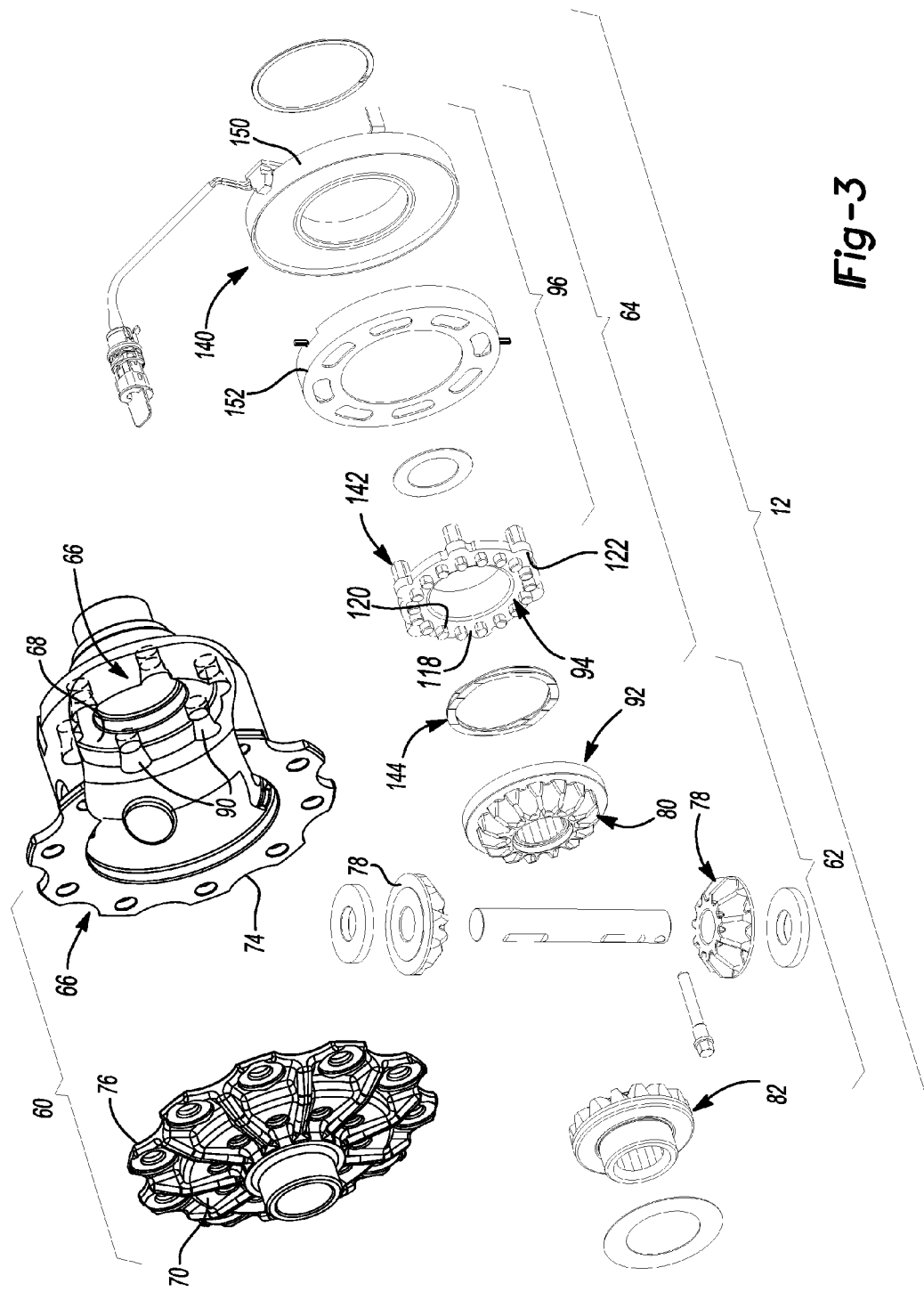
FIG. 3 is an exploded perspective view of a portion of the rear axle assembly, illustrating the locking differential assembly in more detail.

With additional reference to FIG. 3, the locking differential assembly 12 can include a differential case 60, a differential gearset 62, and a locking mechanism 64. The differential case 60 can be formed as one or more discrete components and can define a differential cavity 66 that can be bounded on opposite sides by first and second end walls 68 and 70, respectively. In the particular example provided, the differential case 60 is an assembly that is formed of first and second case members 74 and 76 that are bolted to one another and the ring gear 34. The differential case 60 can be mounted to the axle housing assembly 30 for rotation about a second axis 54, which can be transverse or perpendicular to the first axis 50. The differential gearset 62 can be any type of gearset that can receive rotary power from the differential case 60 and output rotary power to the axle shafts 36. In the particular example provided, the differential gearset 62 comprises bevel gearing (i.e., two or more bevel pinions 78 that are meshingly engaged with first and second (bevel) side gears 80 and 82), but it will be appreciated that other types of gear arrangements, such as spur or helical gear arrangements, could be employed in the alternative. The differential gearset 62 can include a pair of output members, i.e., the first and second side gears 80 and 82, that can be drivingly coupled to the axle shafts 36 in a conventional manner.

Figure 4:
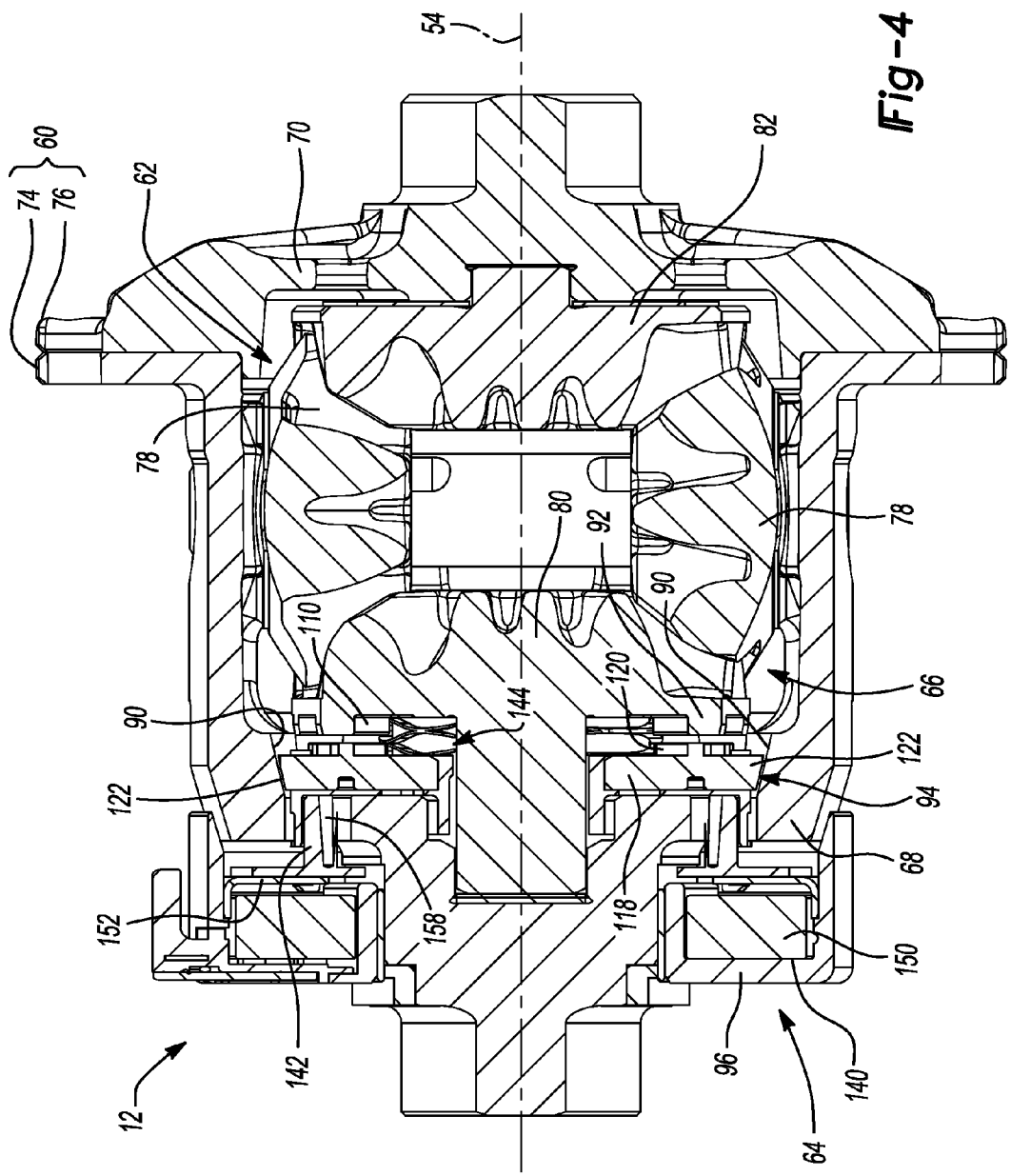
FIG. 4 is a longitudinal section view of the locking differential assembly.

With reference to FIGS. 3 and 4, the locking mechanism 64 can comprise a plurality of lock apertures 90, a first locking dog 92, a second locking dog 94 and an actuator 96.

As best shown in FIGS. 5 and 6, the lock apertures 90 can be formed in the first end wall 68 and can define a first locking surface 100 that is at least partly frusto-conically shaped. Each of the lock apertures 90 can be formed by a rotary cutting tool 102, such as an end mill, a drill or reamer, when the rotary cutting tool 102 is plunged into the first case member 74 along an axis A that is parallel to the second axis 54. In the particular example provided, all of the lock apertures 90 extend completely through the first end wall 68, but those of skill in the art will appreciate that some or all of the lock apertures 90 could be formed in a blind manner so that they are bounded on one side by the first end wall 68.

Returning to FIGS. 3 and 4, the first locking dog 92 comprises a set of first dog teeth 110 that are fixedly coupled to the first side gear 80. The first dog teeth 110 can be disposed on an outboard lateral side of the first side gear 80 and can be spaced circumferentially about the second axis 54.

The second locking dog 94 can have an annular body 118, a set of second dog teeth 120 and a plurality of locking tabs 122. The set of second dog teeth 120 can extend from the annular body 118 and can be configured to be engaged with the set of first dog teeth 110 to inhibit relative rotation between the first and second locking dogs 92 and 94. The locking tabs 122 can be fixedly coupled to the annular body 118 and can extend radially outwardly there from. Each of the locking tabs 122 can be received in a corresponding one of the lock apertures 90. The locking tabs 122 and the lock apertures 90 can cooperate to limit rotation of the second locking dog 94 relative to the differential case 60, while permitting movement of the second locking dog 94 along the second axis 54 relative to the differential case 60. The second locking dog 94 can be movable along the second axis 54 between a first position, in which the set of second dog teeth 120 is disengaged from the set of first dog teeth 110 to permit relative rotation between the first side gear 80 the differential case 60, and a second position in which the set of second dog teeth 120 is engaged with the set of first dog teeth 110 to inhibit relative rotation between the first side gear 80 and the differential case 60.

Figure 7:
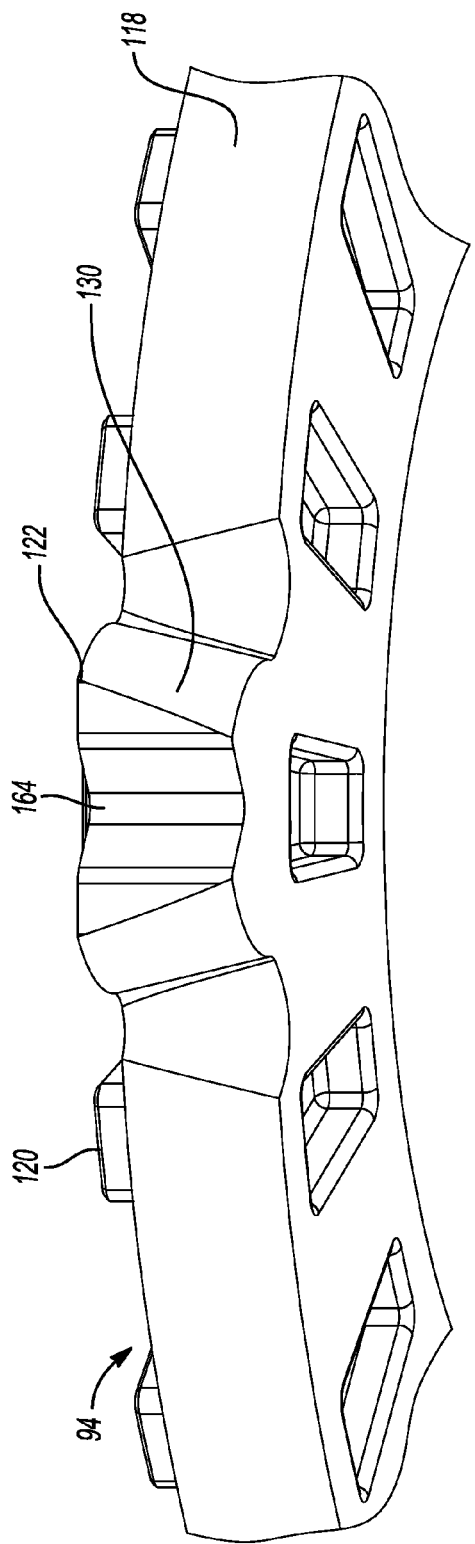
FIG. 7 is a side elevation of a portion of the locking differential assembly illustrating a second locking dog in more detail.
Figure 8:
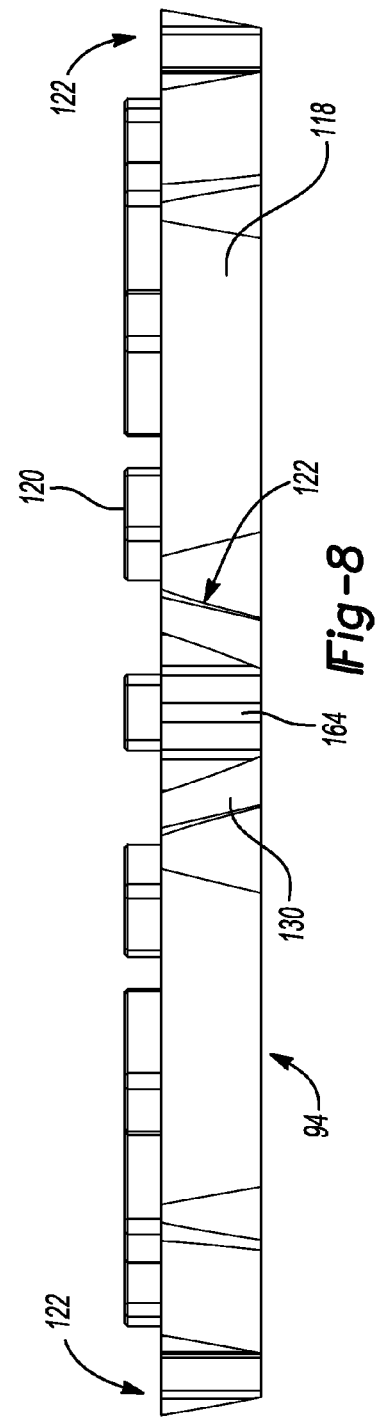
FIG. 8 is a perspective view of a portion of the second locking dog, illustrating a locking tab formed on an annular body of the second locking dog.
Figure 9:
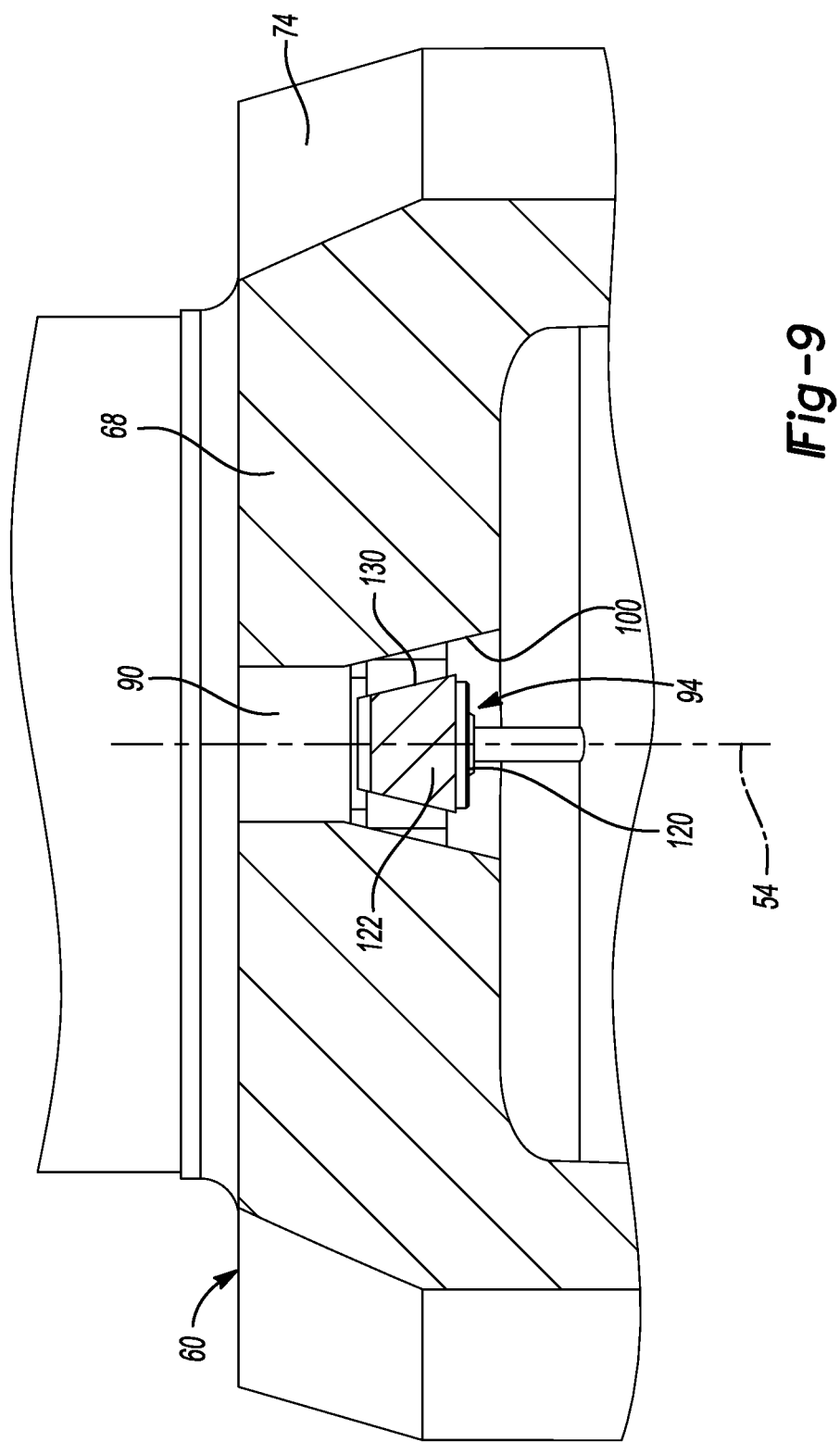
FIG. 9 is a section view of a portion of the locking differential assembly illustrating contact between a first locking surface, which is formed on the differential case, and a second locking surface that is formed on the locking tab of the second locking dog.

With reference to FIGS. 7 through 9, each of the locking tabs 122 can define a second locking surface 130 that is at least partly frusto-conically shaped in a manner that is configured to matingly or correspondingly engage the first locking surface 100. Generally, the lock apertures 90 can be sized somewhat larger than the locking tabs 122 so that some relatively small amount of rotation of the second locking dog 94 about the second axis 54 relative to the differential case 60 is permitted over at least a portion of the stroke or travel of the second locking dog 94 that includes the second position of the second locking dog 94.

Returning to FIGS. 3 and 4, the actuator 96 can be any type of device that can be employed to selectively translate the second locking dog 94 along the second axis 54. Actuators for translating a component of a locking mechanism relative to a differential case are well known in the art and include actuators found in U.S. Pat. Nos. 6,083,134, 6,460, 677, 6,958,030, 7,211,020, 7,325,664, 7,399,248 and 7,425, 185. In the particular example provided, the actuator 96 comprises an annular solenoid 140, a thrust plate 142, and a return spring 144. The annular solenoid 140 can be mounted on the differential case 60 in a manner that permits rotation of the differential case 60 relative to the annular solenoid 140 but which limits movement of the annular solenoid 140 along the second axis 54 in a direction away from the second locking dog 94. The annular solenoid 140 can include an electromagnetic coil 150 and an annular plunger 152 that can be selectively moved along the second axis 54 in response to energization of the electromagnetic coil 150. The thrust plate 142 can be fixedly coupled to the second locking dog 94. In the particular example provided, the thrust plate 142 is formed of a plastic material that is overmolded (i.e., cohesively bonded) to the second locking dog 94. The thrust plate 142 can include a plurality of legs 158 that can extend from second locking dog 94 on a side opposite the set of second locking teeth 120. Each of the legs 158 can extend into an associated one of the lock apertures 90 and can abut a corresponding one of the locking tabs 122. The return spring 144 can be configured to bias the second locking dog 94 away from the first locking dog 92 so that the set of second dog teeth 120 are normally disengaged from the set of first dog teeth 110. In the particular example provided, the return spring 144 is disposed between the first and second locking dogs 92 and 94.

The locking differential assembly 12 can be operated in a first mode, in which the actuator 96 places the second locking dog 94 in the first position so that the set of second dog teeth 120 are disengaged from the set of first dog teeth 110. In this mode, the first side gear 80 is permitted to rotate relative to the differential case 60 so that the locking differential assembly 12 operates as an open differential that permits speed differentiation between the first and second side gears 80 and 82.

The locking differential assembly 12 can also be operated in a second mode, in which the actuator 96 places the second locking dog 94 in the second position so that the set of second dog teeth 120 are engaged to the set of first dog teeth 110. In this mode, the first side gear 80 is locked to the differential case 60 for common rotation so that the locking differential assembly 12 operated as a locked differential that does not permit speed differentiation between the first and second side gears 80 and 82.

With reference to FIGS. 4 and 9, the transmission of torque through the sets of first and second dog teeth 110 and 120 can tend to urge the second locking dog 94 along the second axis 54 away from the first locking dog 92, which may tend to reduce the amount of contact between the sets of first and second dog teeth 110 and 120, particularly when the set of first locking teeth 100 are net formed via forging so as to be somewhat tapered. The sizing and generally frusto-conical configuration of the first and second locking surfaces 100 and 130 permit limited rotation of the second locking dog 94 relative to the differential case 60 as torque is transmitted between the second locking dog 94 and the differential case 60. Moreover, the generally frusto-conical configuration of the first and second locking surfaces 100 and 130 cooperate to generate a force on the locking tabs 122 that tends to drive the second locking dog 94 along the second axis toward the first locking dog 92. Those of skill in the art will appreciate that the first and second locking surfaces 100 and 130 can be contoured or tapered in a desired manner so that a magnitude of the portion of the force that is directed along the second axis 54 can be tailored in a desired manner. For example, a relatively smaller cone angle (used to create the first and second locking surfaces 100 and 130) would produce force having an axially directed component that was relatively lower in magnitude, whereas a relatively larger cone angle would produce a force having an axially directed component that was relatively higher in magnitude. In the particular example provided, the cone angle was selected to produce a force having an axially directed component with a magnitude that was about equal to the force that is generated by the meshing of the first and second dog teeth 110 and 120 (to urge the second locking dog 94 away from the first locking dog 92) when rotary power of a predetermined magnitude and a predetermined rotational direction is transmitted between the first and second locking dogs 92 and 94. Configuration of the differential case 60 and the second locking dog 94 in this manner is advantageous in that the sets of first and second dog teeth 110 and 120 can be formed without back taper. For example, the set of second dog teeth 120 can be formed such that the sides of each tooth can lie in a pair of parallel planes that can be parallel to the second axis 54. One suitable method for forming the set of second dog teeth 110 in this manner include fine blanking. In this regard, the second locking dog 94 could be formed almost in its entirety through fine blanking, and a secondary operation, such as milling or coining, could be employed to form the second locking surfaces 100.

Returning to FIGS. 7 through 9, a notch 164 can be formed in each of the locking tabs 122 to improve the mechanical connection between the locking tabs 122 and the thrust plate 142 in instances where the thrust plate 142 is overmolded onto the locking tabs 122.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A locking differential assembly comprising:
a differential case having a first case member and a second case member that cooperate to define a cavity, the first case member having a first end wall;
a differential gearset received in the cavity, the differential gearset having a first side gear; and
a locking mechanism for selectively locking the first side gear to the differential case for common rotation, the locking mechanism comprising a plurality of lock apertures, a first locking dog, and a second locking dog, the lock apertures being formed in the first end wall, the first locking dog comprising a set of first dog teeth that are fixedly coupled to the first side gear, the second locking dog having an annular body, a set of second dog teeth and a plurality of locking tabs, the set of second dog teeth extending from the annular body and being configured to be engaged with the set of first dog teeth to inhibit relative rotation between the first and second locking dogs, the locking tabs extending radially outwardly from the annular body and being received in the lock apertures, the second locking dog being movable along an axis between a first position, in which the set of second dog teeth is disengaged from the set of first dog teeth to permit relative rotation between the first side gear the differential case, and a second position in which the set of second dog teeth is engaged with the set of first dog teeth to inhibit relative rotation between the first side gear and the differential case;
wherein the lock apertures have a first locking surface that is at least partly frusto-conically shaped, and wherein the locking tabs define a second locking surface that is configured to matingly engage the first locking surface.

2. The locking differential assembly of claim 1, wherein the locking apertures extend completely through the first end wall.

3. The locking differential assembly of claim 2, wherein a thrust plate is overmolded onto the lock tabs.

4. The locking differential assembly of claim 3, wherein the lock tabs define a notch.

5. The locking differential assembly of claim 1, wherein the set of second locking teeth are formed without back taper.

6. A method for forming a locking differential assembly comprising:
  providing a first case member that is configured to be rotatable about a rotary axis, the first case member having a plurality of locking apertures, each of the locking apertures defining a first locking surface with a frusto-conical shape;
  installing a locking dog to the first case member, the locking dog having a body, a set of first locking teeth, and a plurality of locking tabs, the set of first locking teeth extending axially from the body, the locking tabs extending radially from the body and being received into the locking apertures, the locking tabs defining a second locking surface and being received into the locking apertures, at least a portion of the second locking surface being frusto-conically shaped and configured to matingly engage the first locking surface; and
  installing a differential gearset to the first case member, the differential gearset having a side gear with a set of second locking teeth that are configured to selectively matingly engage the set of first locking teeth.

7. The method of claim 6, wherein the set of first locking teeth are formed via fine blanking.

8. The method of claim 7, wherein the second locking surface is formed via milling or coining.

9. The method of claim 6, wherein each of the first locking surfaces is formed by a rotating cutting tool when the rotating cutting tool is plunged into the first case member along an axis that is parallel to the rotary axis.

10. An axle assembly comprising:
  an axle housing;
  a locking differential assembly housed in the axle housing and rotatable about a rotary axis, the locking differential assembly having a differential case, a differential gearset and a locking mechanism, the differential case defining a cavity and having a first end wall, the differential gearset being received in the cavity and having a first side gear, the locking mechanism comprising a plurality of lock apertures, a first locking dog, and a second locking dog, the lock apertures being formed in the first end wall, the first locking dog comprising a set of first dog teeth that are fixedly coupled to the first side gear, the second locking dog having an annular body, a set of second dog teeth and a plurality of locking tabs, the set of second dog teeth extending from the annular body and being configured to be engaged with the set of first dog teeth to inhibit relative rotation between the first and second locking dogs, the locking tabs extending radially outwardly from the annular body and being received in the lock apertures such that the second locking dog is non-rotatably but slidably mounted to the differential case, the second locking dog being movable along the rotary axis between a first position, in which the set of second dog teeth is disengaged from the set of first dog teeth to permit relative rotation between the first side gear the differential case, and a second position in which the set of second dog teeth is engaged with the set of first dog teeth to inhibit relative rotation between the first side gear and the differential case; and
  a pair of axle shafts driven by the differential assembly;
  wherein the lock apertures have a first locking surface that is at least partly frusto-conically shaped, and wherein the locking tabs define a second locking surface that is at least partly frusto-conically shaped so as to correspondingly engage the first locking surface.

11. The locking differential assembly of claim 10, wherein the locking apertures extend completely through the first end wall.

12. The locking differential assembly of claim 11, wherein a thrust plate is overmolded onto the lock tabs.

13. The locking differential assembly of claim 12, wherein the lock tabs define a notch.

14. The locking differential assembly of claim 10, wherein the set of second locking teeth are formed without back taper.

* * * * *